US009601018B2

(12) United States Patent
Cogill et al.

(10) Patent No.: US 9,601,018 B2
(45) Date of Patent: Mar. 21, 2017

(54) DISTRIBUTED PARKING SPACE DETECTION, CHARACTERIZATION, ADVERTISEMENT, AND ENFORCEMENT

(71) Applicant: International Business Machines Corporation, Armonk, NY (US)

(72) Inventors: Randall L. Cogill, Dublin (IE); Olivier Gallay, Zurich (CH); Chungmok Lee, Dublin (IE); Zubair Nabi, Dublin (IE); Martin Rufli, Winterthur (CH); Robert Shorten, Dublin (IE); Tigran Tchrakian, Dublin (IE); Rudi Verago, Dublin (IE); Fabian R. Wirth, Bremen (DE); Jia Y. Yu, Quebec (CA); Sergiy Zhuk, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/645,518

(22) Filed: Mar. 12, 2015

(65) Prior Publication Data

US 2016/0267794 A1 Sep. 15, 2016

(51) Int. Cl.
*B60Q 1/48* (2006.01)
*G08G 1/14* (2006.01)

(52) U.S. Cl.
CPC ............. *G08G 1/143* (2013.01); *G08G 1/144* (2013.01); *G08G 1/146* (2013.01); *G08G 1/149* (2013.01)

(58) Field of Classification Search
CPC ..... G08G 1/144; G06Q 20/14; G06Q 20/3276
USPC ..... 340/932.2, 907, 901, 431, 933; 701/537, 701/426, 454
See application file for complete search history.

(56) References Cited

U.S. PATENT DOCUMENTS 6,147,624 A 11/2000 Clapper
6,266,609 B1 7/2001 Fastenrath
6,683,539 B2 1/2004 Trajkovic et al.
6,927,700 B1 8/2005 Quinn
(Continued)

FOREIGN PATENT DOCUMENTS

DE 102011086268 A1 5/2013
WO WO2013/086140 A1 6/2013

OTHER PUBLICATIONS

"Cameras in Motor Vehicles to Grow More Than Fivefold by 2020", IHS Technology, https://technology.ihs.com/435562/cameras-in-motor-vehicles-to-grow-more-than-fivefold-by-2020, May 16, 2013, 2 pages.

Connected Car Industry Report 2014_, Telephonica, m2m, United Kingdom, 2002 (month unknown), 21 pages.

Basu, Prithwish et al., "Networked Parking Spaces: Architecture and Applications", IEEE 56th Proceedings of the Vehicular Technology Conference, VTC 2002, Fall 2002, vol. 2, Vancouver, Canada, pp. 1153-1157.

Panayappan, Ramu et al., "VANET-based Approach for Parking Space Availability", VANET'07, Montreal, Quebec, Canada, Sep. 10, 2007, pp. 75-76.

True, Nicholas, "Vacant Parking Space Detection in Static Images", http://cseweb.ucsd.edu/classes/wi07/cse190-a/reports/ntrue.pdf, University of California, San Diego, 2007 (month unknown), 6 pages.

Wu, Qi et al., "Parking Lots Space Detection", http://www.cs.cmu.edu/~epxing/Class/10701-06f/project-reports/wu_zhang.pdf, Machine Learning, 2006, 8 pages.

*Primary Examiner* — Hoi Lau

(74) *Attorney, Agent, or Firm* — Francis Lammes; Stephen J. Walder, Jr.; Kurt P. Goudy

(57) ABSTRACT

A mechanism is provided for parking space management of a managed parking structure. Information is received from a vehicle that has parked in the managed parking structure. The information from the vehicle is utilized to determine a probabilistic location of the vehicle within the managed parking structure. Responsive to determining the probabilistic location of the vehicle within the managed parking structure using the information from the vehicle, an occupied parking space evidence data structure is updated with a vehicle identifier of the vehicle as being associated with the location of the vehicle within the managed parking structure.

20 Claims, 7 Drawing Sheets

(56) References Cited

U.S. PATENT DOCUMENTS

| | | | | |
|---|---|---|---|---|
| 7,516,010 | B1 * | 4/2009 | Kaplan | G01C 21/30 340/932.2 |
| 8,063,797 | B1 | 11/2011 | Sonnabend et al. | |
| 8,279,087 | B2 | 10/2012 | Knoll et al. | |
| 2007/0040701 | A1 * | 2/2007 | Browne | G08G 1/143 340/932.2 |
| 2011/0133957 | A1 | 6/2011 | Harbach et al. | |
| 2012/0056758 | A1 * | 3/2012 | Kuhlman | G08G 1/14 340/932.2 |
| 2012/0092190 | A1 * | 4/2012 | Stefik | G06Q 10/02 340/932.2 |
| 2012/0188101 | A1 * | 7/2012 | Ganot | G07B 15/02 340/932.2 |
| 2012/0200430 | A1 * | 8/2012 | Spahl | G01C 21/3685 340/932.2 |
| 2012/0262305 | A1 | 10/2012 | Woodard et al. | |
| 2014/0176348 | A1 * | 6/2014 | Acker, Jr. | G08G 1/144 340/932.2 |
| 2015/0009047 | A1 * | 1/2015 | Ashkenazi | G08G 1/144 340/932.2 |
| 2015/0149263 | A1 * | 5/2015 | Stenneth | G07B 15/02 705/13 |
| 2015/0369613 | A1 * | 12/2015 | Stadler | G01C 21/32 701/537 |

* cited by examiner

DISTRIBUTED PARKING SPACE DETECTION, CHARACTERIZATION, ADVERTISEMENT, AND ENFORCEMENT

BACKGROUND

The present application relates generally to an improved data processing apparatus and method and more specifically to mechanisms for detecting, characterizing, advertising, and enforcing of parking spaces.

Currently, when a driver wants to park their vehicle, the driver follows signs to parking garages indicating available parking spaces or alternatively cruises the parking lot fir empty parking space opportunity. Studies estimate that 7 to 21 percent of urban traffic is accounted for by drivers searching Coca parking space. Furthermore, a prolonged search for a parking space induces driver stress.

Recent studies and policy measures propose and encourage parking space reservation based on real-time information, dynamic parking fees based on real-time demand, and restrictive usage of certain parking spaces to specific needs, such as vehicle classes, driver & passenger needs, etc. In order to prepare for these improvements, parking space providers, such as cities, airports, parking garages, etc., have begun to integrate reservation systems and dedicated sensing capabilities into their parking structures. However, the parking space management infrastructure required for smaller parking structures, road-side parking spaces, and the like, is costly. Furthermore, the parking space management infrastructure is difficult to upgrade to keep pace with changing parking habits and desires.

SUMMARY

In one illustrative embodiment, a method, in a data processing system, is provided for parking space management of a managed parking structure. The illustrative embodiment receives first information from a vehicle that has parked in the managed parking structure. The illustrative embodiment utilizes the first information from the vehicle to determine a probabilistic location of the vehicle within the managed parking structure. Responsive to determining the probabilistic location of the vehicle within the managed parking structure using the first information from the vehicle, the illustrative embodiment updates an occupied parking space evidence data structure with a vehicle identifier of the vehicle as being associated with the location of the vehicle within the managed parking structure.

In other illustrative embodiments, a computer program product comprising a computer useable or readable medium having a computer readable program is provided. The computer readable program, when executed on a computing device, causes the computing device to perform various ones of, and combinations of the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
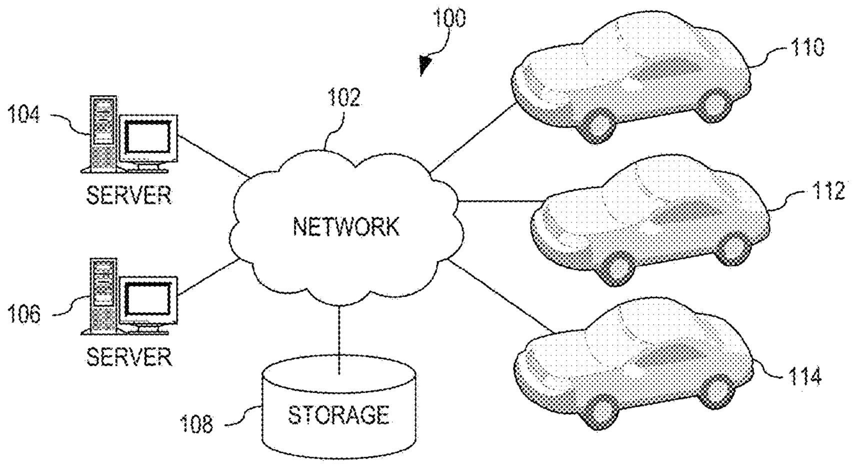
FIG. 1 is an example diagram of a distributed data processing system in which aspects of the illustrative embodiments may be implemented.

In order to manage parking spaces without costly parking space management infrastructure or continuous upgrades to keep pace with changing parking habits and desires, the illustrative embodiments provide mechanisms for detecting, characterizing, advertising, and enforcing of parking spaces utilizing sensor information associated with vehicles in the managed parking structure.

Instead of relying on fixed and expensive parking space management infrastructure, the illustrative embodiments provide a resilient collaborative parking space management system based on multi-agent localization, local sensing, and joint verification. Utilizing the provided mechanisms, drivers are provided with detection, characterization, and advertisement of free parking spaces in a managed parking structure using multiple sensors, such as a global position system (GPS), cameras, ultrasound, infrared, or the like, associated with vehicles in conjunction with a layout of the managed parking structure. That is, the mechanisms utilize information obtained from vehicles in the managed parking structure to more effectively, reliably, and precisely deduce information on free or occupied parking spaces in the managed parking structure. The mechanisms also provide for improved parking enforcement for improperly or illegally occupied parking spaces in the vicinity of vehicles using the multiple sensors associated with the vehicles in conjunction with the layout of the managed parking structure.

Thus, the illustrative embodiments employ current and future vehicle infrastructure to allow for permanent cost effective characterization, advertisement, and enforcement of parking areas. The mechanisms allow monetization of parked vehicles, which represent an otherwise wasted resource. The mechanisms are robust to failure due to collaboration between and partial overlap of the sensing area of neighboring parked vehicles and can be continuously upgraded as new sensing technology and better processing power becomes available in vehicles.

Before beginning the discussion of the various aspects of the illustrative embodiments it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
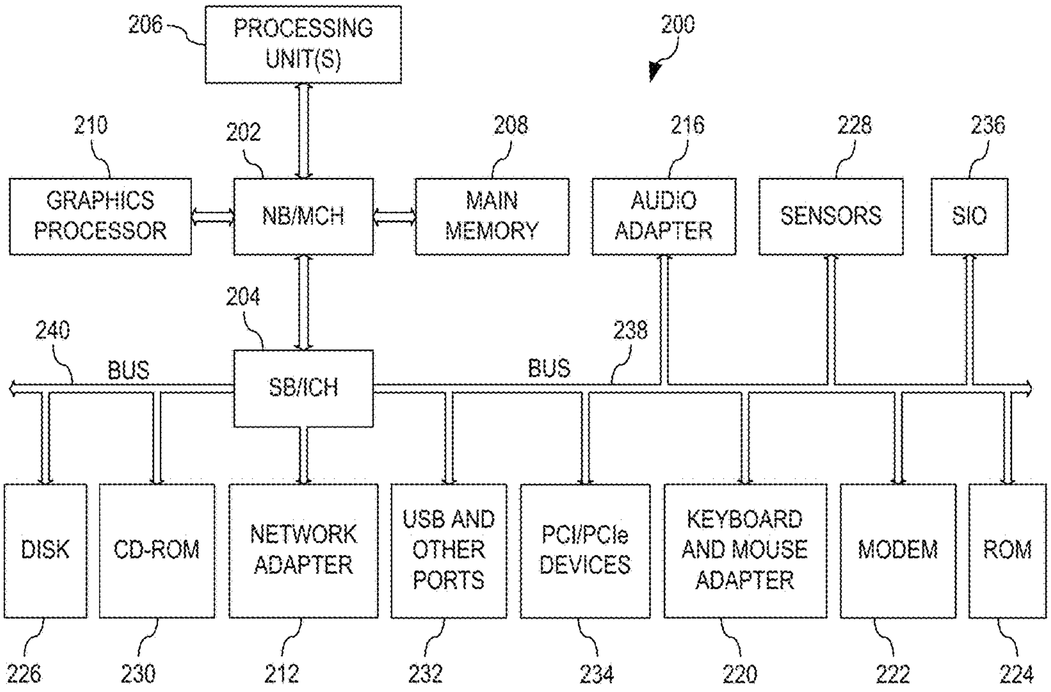
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, vehicles 110, 112, and 114 are also connected to network 102. These vehicles 110, 112, and 114 my be, for example, any type of vehicle that is equipped with sensors, such as cameras, ultrasound, infrared, a global positioning system (GPS), radar, or the like, and communication capabilities, such as WiFi, Global System for Mobile Communications (GSM), Bluetooth, or the like, for precise localization, mapping, and data/information exchange. In the depicted example, server 104 provides data, such as boot files, operating system images, and applications to the vehicles 110, 112, and 114. Vehicles 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computing system, such as that in vehicle 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, white PCIe does not. ROM 224 may be, for example, a flash basic input/output system (BIOS). Also connected to bus 238 are sensors 228, such as a global position system (GPS), cameras, ultrasound, infrared, or the like.

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2 As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
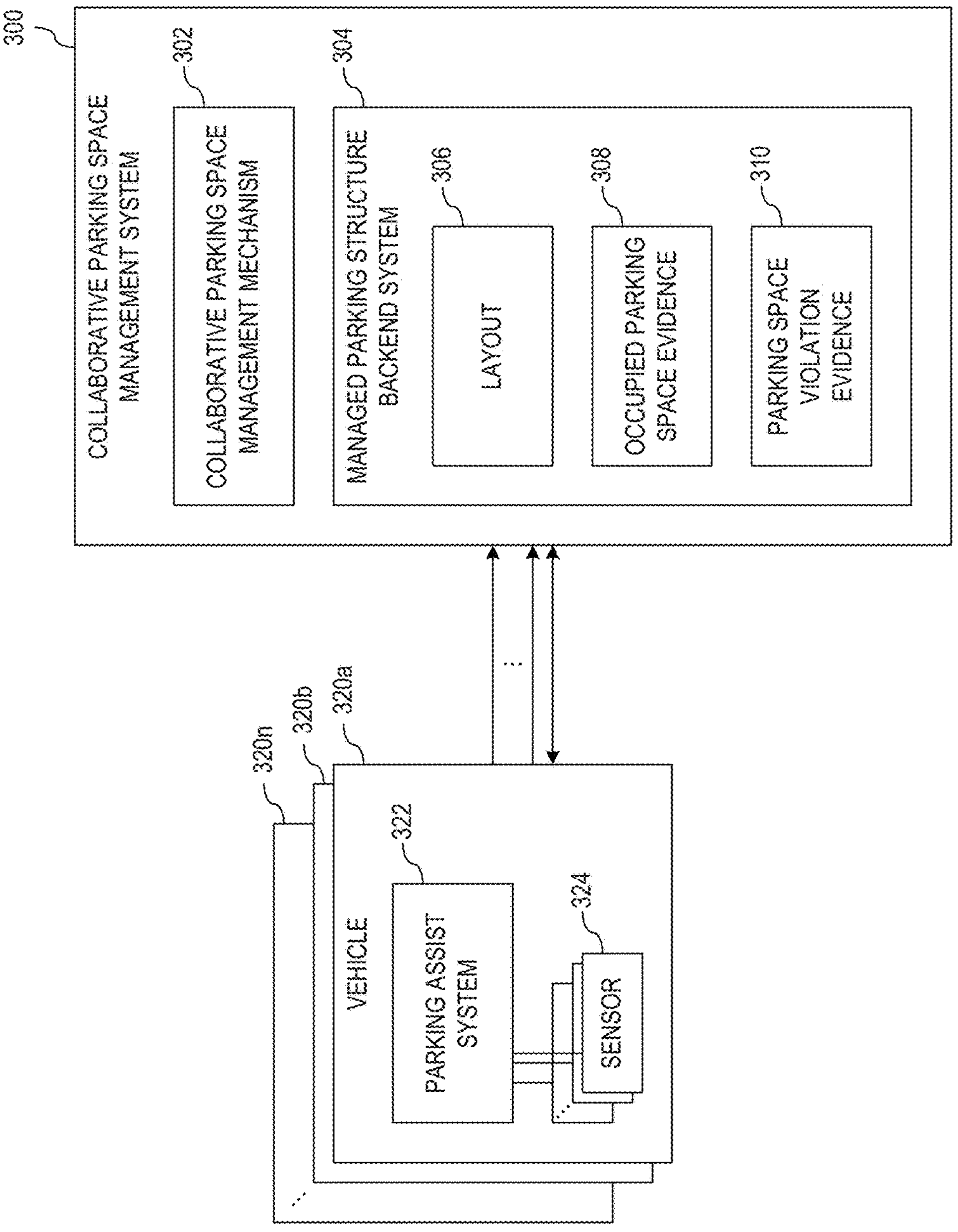
FIG. 3 depicts a functional block diagram of a collaborative parking space management system in accordance with an illustrative embodiment.

FIG. 3 depicts a functional block diagram of a collaborative parking space management system in accordance with an illustrative embodiment. Collaborative parking space management system 300 comprises a collaborative parking space management mechanism 302 working in conjunction with or as part of managed parking structure backend system 304 and one or more vehicles 320*a*-320*n*. Each of vehicles 320*a*-320*n* comprises a parking assist system 322 and one or more sensors 324. Managed parking structure backend system 304 comprises a layout, map, blueprint, floorplan, or the like, hereinafter referred to simply as layout 306, of the parking structure that is to be managed. The managed parking structure may be parking spaces that line one or more city streets with or without metering, an open-air parking lot with identified parking spaces with or without security, a multi-level parking garage with or without security, or any other structure in which vehicles may be parked. Layout 306 provides a layout of the managed parking structure that identifies parking spaces, parking space sizes (e.g. height, width, length, etc.), widths of spaces adjacent to the parking spaces, whether the parking space is general use, reserved, valet, handicap, emergency vehicle, or the like, loading zones and no-parking areas, as well as objects that exist in or around the managed parking structure and inhibit parking, such as walls, columns, embankments, curbs, pre-cast parking curbs, or any other object that may exist in or around the managed parking structure.

Utilizing layout 306, parking space management mechanism 302 obtains evidence of available parking spaces within the managed parking structure. Available parking spaces are parking spaces that are available for a vehicle to park, such as not being occupied by another vehicle, not blocked for maintenance, not restricted for access, or the like. Then, as a vehicle parks in one of the parking spaces in the managed parking structure, parking space management mechanism 302 probabilistically identifies a particular parking space where the vehicle is parked utilizing sensor information from the vehicle as well as sensor information from other vehicles. That is, when vehicles 320*a*-320*n* park within the managed parking structure, which is identified when the driver places the vehicle into Park (P), parking assist system 322 in vehicles 320*a*-320*n* utilize sensors 324 such as cameras, ultrasound, infrared, a global positioning system (UPS), radar, or the like, to identify the location where the vehicle parked. The sensor information may be transmitted to parking space management mechanism 302 as the vehicle is placed into Park (P), or in a time period just prior to the vehicle being placed into Park (p). For example, a front end camera identifying a parking space number of a parking space when the vehicle enters the parking space, which is prior to the vehicle being placed into Park (P). As another example, GPS sensor identifying latitude, longitude, and elevation of the vehicle and thus the parking space. As yet another example, ultrasound sensors identify the distance to objects in the managed parking structure, such as other identified vehicles, columns, curbs, poles, precast concrete curbs, or the like. Pa ting assist system 322 in vehicles 320*a*-320*n* send this information, such as those exemplified as well as any other information sensors 324 of vehicles 320*a*-320*n* detect, along with a vehicle identifier to parking space management mechanism 302 via the communication capabilities of parking assist system 322, such as WiFi, Global System for Mobile Communications (GSM), Bluetooth, or the like.

Utilizing the received information from vehicles 320*a*-320*n* and layout 306, parking space management mechanism 302 identifies a probabilistic location where a newly parked one of vehicles 320*a*-320*n* is parked in the managed parking structure. That is, parking space management mechanism 302 utilizes distance information indicating one or more distances from the vehicle to other walls, columns, embankments, curbs, precast parking curbs, other vehicles, or the like, in addition to UPS coordinates, photometric cues coming from one or more cameras on the vehicle, etc., when correlated to layout 306, as well as other evidence of other vehicles in occupied parking space evidence data structure 308 to make a probabilistic determination where vehicle 320*a* has parked. Once parking space management mechanism 302 makes an identification of the occupied parking space within a predetermined threshold of the probabilistic determination from the newly parked one of vehicles 320*a*-320*n* or other ones of vehicles 320*a*-320*n*, parking space management mechanism 302 updates occupied parking space evidence data structure 308 with the vehicle identifier as the vehicle occupying the parking space.

In a reverse operation, when the driver of a parked one of vehicles 320*a*-320*n* shifts from Park (P) to Reverse (R) Or Drive (D) thereby moving the vehicle or when other ones of vehicles 320*a*-320*n* detect a change in vehicles in their proximity, parking assist system 322 in one or more vehicles 320*a*-320*n* send an indication of the moving vehicle to parking space management mechanism 302 via the communication capabilities of parking assist system 322. Upon detecting that a vehicle has moved from an indicated occupied parking space, parking space management mechanism 302 updates occupied parking space evidence data structure 308 removing the vehicle identifier and showing the parking space as unoccupied.

Utilizing occupied parking space evidence data structure 308, parking space management mechanism 302 may also assist drivers in parking their vehicles. That is, parking assist system 322 in vehicle 320*a* of the driver connects to the parking space management mechanism 302 with an inquiry as to available parking spaces. As part of the inquiry, parking assist system 322 may identify the current location or the intended destination of vehicle 320*a*. Parking space management mechanism 302 then identifies one or more unoccupied parking spaces based on the location/destination provided by parking assist system 322 and relays the one or more unoccupied parking spaces to parking assist system 322 in vehicle 320*a*. Parking space management mechanism 302 may also provide characteristic information associated with the parking space, such as size of the parking space (e.g., height, width, length, etc.), widths of spaces adjacent to the parking spaces, a type of the parking space (e.g., disabled only, e-charging station, etc.), accessibility of the parking spaces (e.g., distance from sidewalk, between other vehicles, etc.), ambient temperature and presence of shade, proximity to points of interest (shops, restaurants, exit, etc.), statistics on occupation of the managed parking structure, or the like.

Parking assist system 322 may then present a location of the one or more unoccupied parking spaces as well as information associated with the parking space to the driver via one or more of a video output, an audio output, or a combination of an audio and video output to a display and or speaker system associated with parking assist system 322 in vehicle 320*a* or to a smart device of the driver via a WiFi transmission, Bluetooth transmission, GSM transmission, or the like. Once the driver parks their vehicle in one of the one or more unoccupied parking spaces, parking assist system 322 and parking space management mechanism 302 indicate the parking space as occupied in accordance with the process identified previously. If one or more of the presented one or more unoccupied parking spaces becomes occupied by another vehicle before the driver of the requesting vehicle reaches that parking space, parking space management mechanism 302 may provide parking assist system 322 with an updated identification of one or more unoccupied parking spaces based on the location/destination so that parking assist system 322 may then present an updated location of the one or more unoccupied parking spaces as well as information associated with the parking space to the driver.

In addition to identifying occupied and unoccupied parking spaces and assisting drivers to an unoccupied parking space, parking space management mechanism 302 may also assist management of the managed parking structure in identifying parking violations. For example, if in analyzing the distance information, GPS coordinates, photometric cues coming from one or more cameras on the vehicle, etc., provided by parking assist system 322 in one or more of vehicles 320*a*-320*n* when vehicles 320*a*-320*n* are placed into Park (P), parking space management mechanism 302 also identifies whether the vehicle has parked in a loading zone, reserved parking space, handicap parking space, emergency vehicle only parking space, in more than one parking space, has not self-reported as being parked, has no record as having a valid parking permit/ticket, or the like. That is, parking space management mechanism 302 compares a vehicle identifier provided by parking assist system 322 of the vehicle with those vehicle(s) that have the privileges of parking in such parking spaces. If a vehicle identifier provided by parking assist system 322 does not match with vehicle(s) that have the privileges of parking in such parking spaces, parking space management mechanism 302 issues a notification to a parking enforcement entity informing them of the violation and stores the notification in parking space violation evidence data structure 310.

For example, if a driver parks their vehicle in a reserved parking space and the vehicle identifier associated with the reserved parking space does not correlate with a vehicle identifier registered for that reserved parking space, then parking space management mechanism 302 issues a notification to a parking enforcement entity informing them of the violation and stores the notification in parking space violation evidence data structure 310. As another example, if a driver parks or stops their vehicle in a loading zone and the vehicle stays in the loading zone for more than a predetermined time period, then parking space management mechanism 302 issues a notification to a parking enforcement entity informing them of the violation and stores the notification in parking space violation evidence data structure 310. As still a further example, if a vehicle is parked in an un-restricted parking space but has failed to pay reserved parking fees, purchase a valid parking permit/ticket through an online or onsite parking permit/ticket system, or the like, then parking space management mechanism 302 issues a notification to a parking enforcement entity informing them of the violation and stores the notification in parking space violation evidence data structure 310. In this example, when a user purchases a parking permit/ticket, parking space management mechanism 302 associated the permit with the parking space thereby indicating that parking permit for the parking space has been paid for. Parking space management mechanism 302 may be able to associate a vehicle identifier with the purchaser based on, for example, if their parking space is reserved, then the user may provide the vehicle identifier or, as another example, if a user parks their vehicle and then purchases a parking permit for the parking space, using the vehicle identifier identified when the vehicle was parked with the parking permit.

Similar violations would occur if a vehicle without an emergency vehicle identifier parks in an emergency vehicle only parking space or if a vehicle without a handicap vehicle identifier parks in a handicap only parking space. Vehicle identifiers may be set or adjusted based on the type of vehicle with which it is associated. For example, an emergency vehicle, such as a police officer, code enforcement, metering vehicle, or the like will be coded with an emergency vehicle identifier during manufacturing and/or aftermarket. However, a handicap vehicle may be coded as handicap during manufacturing or aftermarket. For the aftermarket instance, when the driver is issued a handicap placard or license plate, the driver enters the handicap registration number into the parking assist system 322 so that parking assist system 322 provides this information in addition to the distance information, GPS coordinates, photometric cues coming from one or more cameras on the vehicle, etc., when the information is sent to parking space management mechanism 302. Parking space management mechanism 302 may further be coupled to the issuing office system that issued the handicap placard or license plate to validate whether or not the handicap placard or license plate is still valid.

Additionally, in assisting the management of the managed parking structure in identifying parking violations, parking space management mechanism 302 may also identify time durations for a particular vehicle occupying a parking space. For example, if a driver parked their vehicle in a 2-hour parking space on a city street and parking space management mechanism 302 determined that the vehicle has been there for more than the 2-hour duration, then parking space management mechanism 302 issues a notification to a parking enforcement entity informing them of the violation and stores the notification in parking space violation evidence data structure 310. As another example, if a managed parking structure is a daily parking only managed parking structure, i.e. no overnight parking, and parking space management mechanism 302 identifies that a vehicle has been parked in a parking space overnight, then parking space management mechanism 302 issues a notification to a parking enforcement entity informing them of the overnight parking violation and stores the notification in parking space violation evidence data structure 310.

As still another embodiment with regard to parking space violation management in order to deter parking violations, parking space management mechanism 302 may utilize the information provided by parking assist system 322 in vehicle **320*a* to determine whether vehicle 320*a* is violating a parking law, public policy, local code, or the like. For example, if a driver pulls their vehicle up to a curb on a street in an attempt to park their vehicle and one or more of sensors 324 detects a fire hydrant next to the vehicle using a side mirror camera, the vehicle is stopped in a marked loading zone using front, side, or rear cameras, the vehicle is stopped too far from the curb using an ultrasound, infrared, or radar sensor, or the like, or if after submitting the information to parking space management mechanism 302, parking space management mechanism 302 identifies the parking space as a no-parking area, emergency vehicle only area, or the like, parking space management mechanism 302 and/or parking assist system 322 may present a violation warning to the driver via one or more of a video output, an audio output, or a combination of an audio and video output to a display and/or speaker system associated with parking assist system 322 in vehicle 320*a* or to a smart device of the driver via a WiFi transmission, Bluetooth transmission, GSM transmission, or the like. Parking space management mechanism 302 and/or parking assist system 322** may be a preemptive effort to reduce parking violations.

If, however, the driver does not pay heed to the violation warning and parking space management mechanism 302 issues a notification to a parking enforcement entity informing them of the violation and stores the notification in parking space violation evidence data structure 310, parking space management mechanism 302 retains the violation information in parking space violation evidence data structure 310 until such time that the vehicle is moved by the driver or parking of another vehicle in the same parking space indicates that the vehicle has been moved, such as through towing, pushing the vehicle out of the parking space, or the like. Only upon identifying that the vehicle no longer occupies the particular parking space where the violation was issued does parking space management mechanism 302 remove the violation from parking space violation evidence data structure 310.

Thus, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media e.g., tight pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor, of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
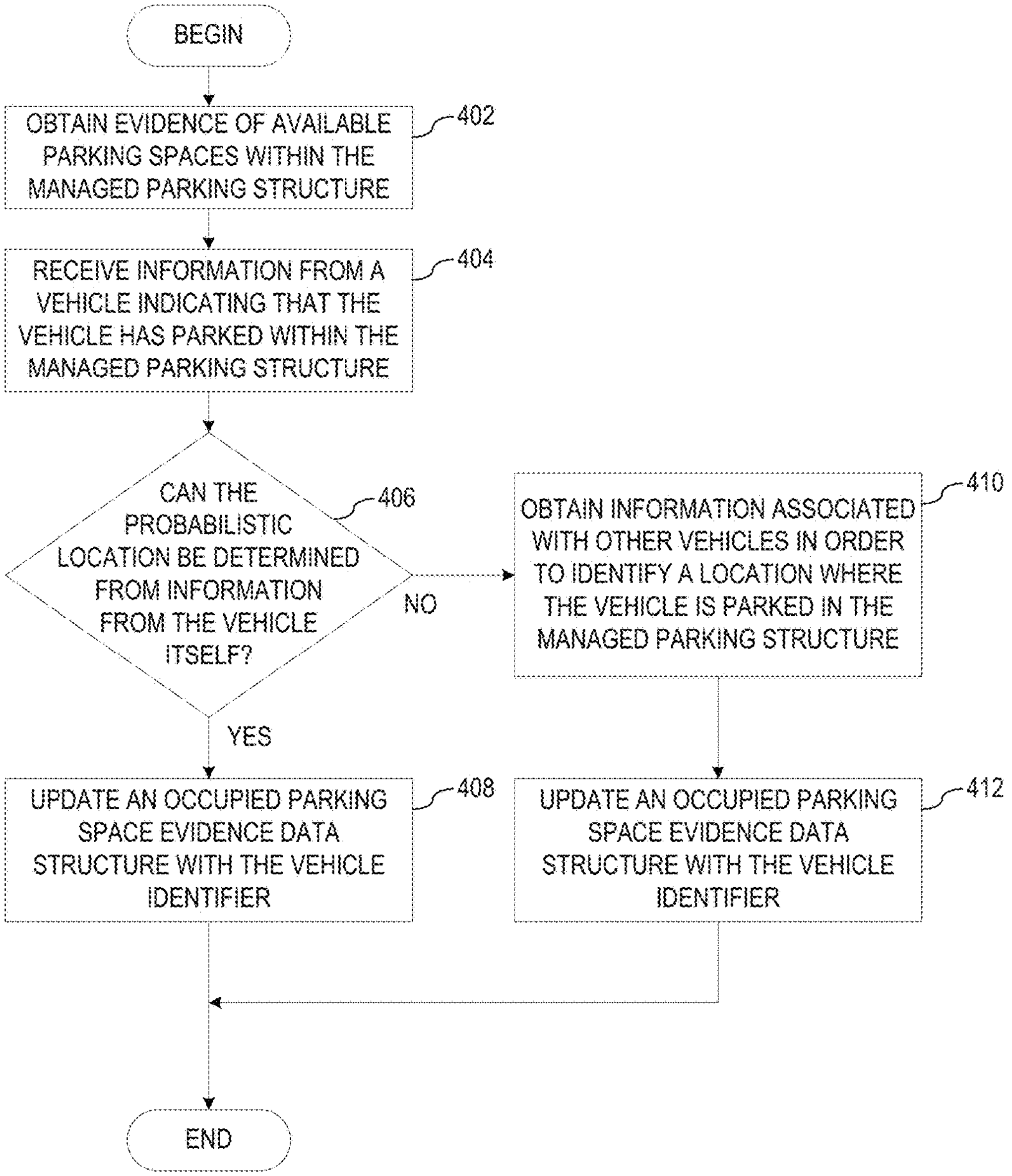
FIG. 4 depicts a flowchart of an operation performed by a parking space management mechanism in identifying an occupied parking space in accordance with an illustrative embodiment.

FIG. 4 depicts a flowchart of an operation performed by parking space management mechanism in identifying an occupied parking space in accordance with an illustrative embodiment. As the operation begins, the parking space management mechanism obtains evidence of available parking spaces within the managed parking structure (step 402). This evidence may be based on a layout of the managed parking structure as well as occupied parking space evidence data structure, which may be identified from one or more vehicles utilizing the managed parking structure. The parking space management mechanism then receives information from one or more vehicles utilizing the managed parking structure indicating that a vehicle has parked within the managed parking structure (step 404). The information from the vehicle includes a vehicle identifier associated with the vehicle as welt as one or more pieces of information, such as distance information indicating one or more distances from the vehicle to other walls, columns, embankments, curbs, precast parking curbs, other vehicles, or the like, GPS coordinates, photometric cues coming from one or more cameras on the vehicle, or the like. Utilizing the received information from the vehicle and the evidence of available parking spaces, the parking space management mechanism attempts to identify a probabilistic location where the vehicle is parked in the managed parking structure using information from the vehicle itself (step 406). That is, the parking space management mechanism utilizes information indicating one or more distances from the vehicle to other walls, columns, embankments, curbs, precast parking curbs, other vehicles, or the like, in addition to the GPS coordinates, photometric cues coming from one or more cameras on the vehicle, etc. If at step 406 the parking space management mechanism determines the probabilistic location where the vehicle is parked in the managed parking structure using information from the vehicle itself, then the parking space management mechanism updates an occupied parking space evidence data structure with the vehicle identifier as the vehicle occupying the parking space (step 408), which in turn updates the list of available parking spaces, with the operation terminating thereafter.

If at step 406 the parking space management mechanism determines that the probabilistic location where the vehicle is parked in the managed parking structure cannot be determined using information from the vehicle itself, the parking space management mechanism obtains information associated with other vehicles utilizing the managed parking structure and uses this information in conjunction with the received information from the vehicle itself to identify a location where the vehicle is parked in the managed parking structure (step 410). That is, the parking space management mechanism utilizes information indicating one or more distances from vehicles to other walls, columns, embankments, curbs, precast parking curbs, other vehicles, or the like, in addition to the GPS coordinates, photometric cues coming from one or more cameras on the vehicle, etc., when correlated to the evidence of available parking spaces, which identifies evidence of other vehicles to make a probabilistic determination where the vehicle has parked. From step 410, the parking space management mechanism updates an occupied parking space evidence data structure with the vehicle identifier as the vehicle occupying the parking space (step 412), which in turn updates the list of available parking spaces, with the operation terminating thereafter.

Figure 5:
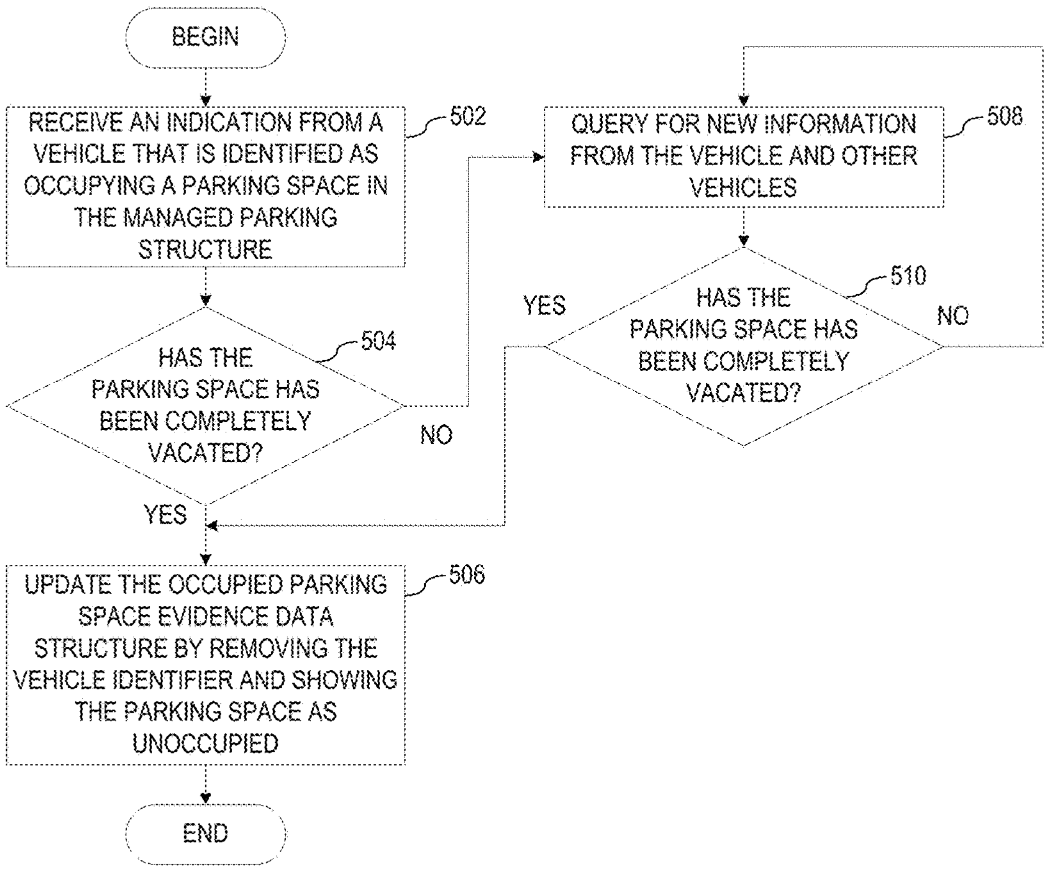
FIG. 5 depicts a flowchart of an operation performed by a parking space management mechanism in indicating a space as an unoccupied parking space in accordance with an illustrative embodiment.

FIG. 5 depicts a flowchart of an operation performed by a parking space management mechanism in indicating a space as an unoccupied parking space in accordance with an illustrative embodiment. As the operation begins, the parking space management mechanism receives an indication from a vehicle that is identified as occupying a parking space in the managed parking structure (step 502), the indication being a change from Park (P) to Reverse (R) or Drive (D) thereby indicating a movement of the vehicle, a vehicle identifier, as well as other information from the sensors associated with the vehicle. The parking space management mechanism then verifies whether the parking space has been completely vacated by analyzing the information associated with the vehicle itself (step 504). If at step 504 the parking space management mechanism determines that the vehicle has completely vacated the parking space utilizing the information from the vehicle itself, the parking space management mechanism updates the occupied parking space evidence data structure by removing the vehicle identifier and showing the parking space as unoccupied (step 506), with the operation ending thereafter. If at step 504 the parking space management mechanism determines that vacancy of the parking space cannot be determined using only the information from the vehicle itself, the parking space management mechanism may query for new information from the vehicle as well as other information from other vehicles utilizing the parking structure (step 508). The parking space management mechanism then verifies whether the parking space has been completely vacated by analyzing the information associated with the vehicle itself as well as other information from other vehicles utilizing the parking structure (step 510). If at step 510 the parking space management mechanism determines that the vehicle has completely vacated the parking space utilizing the information associated with the vehicle itself as well as other information from other vehicles utilizing the parking structure, the operation proceeds to step 506. If at step 510 the parking space management mechanism determines that vacancy of the parking space cannot be determined using the information associated with the vehicle itself as welt as other information from other vehicles utilizing the parking structure, the operation returns to step 508 to gather more information.

Figure 6:
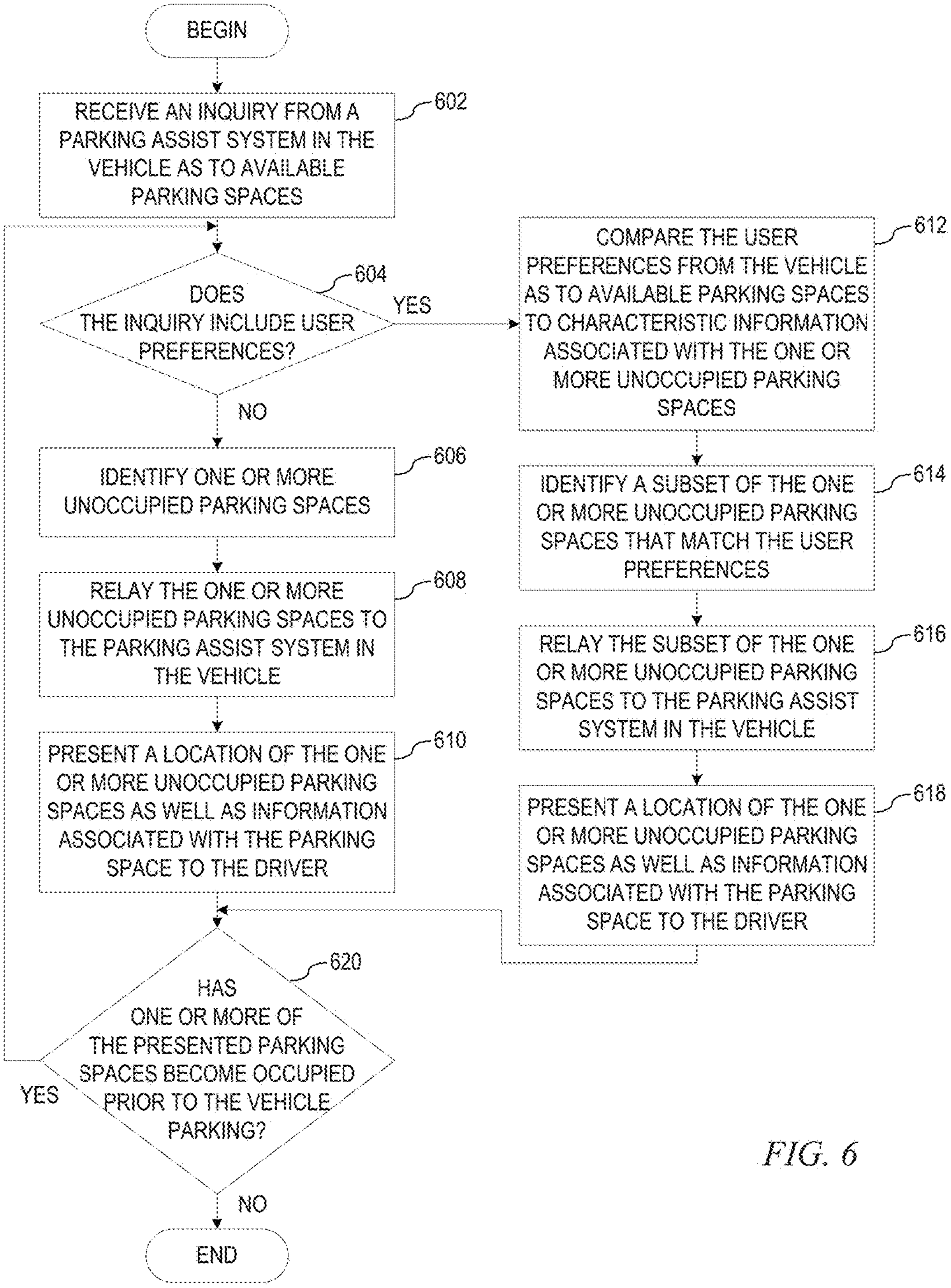
FIG. 6 depicts a flowchart of an operation performed by a parking space management mechanism in assisting a driver in finding an unoccupied parking space in accordance with an illustrative embodiment.

FIG. 6 depicts a flowchart of an operation performed by a parking space management mechanism in assisting a driver in finding an unoccupied parking space in accordance with an illustrative embodiment. As the operation begins, the parking space management mechanism receives an inquiry from a parking assist system in the vehicle as to available parking spaces (step 602). As part of the inquiry, the parking assist system identifies a current location of the vehicle or the intended destination as well as, possibly, one or more user preferences. Thus, the parking space management mechanism determines whether the inquiry includes any user preferences (step 604). If at step 604 the inquiry fails to include user preferences, the parking space management mechanism identifies one or more unoccupied parking spaces based on the location/destination provided by the parking assist system (step 606) and relays the one or more unoccupied parking spaces to the parking assist system in the vehicle (step 608).

The parking space management mechanism may also provide characteristic information associated with the parking space, such as size of the parking space (e.g., height, width, length, etc.), a type of the parking space (e.g., disabled only, e-charging station, etc.), accessibility of the parking spaces (e.g., distance from sidewalk, between other vehicles, etc.), ambient temperature and presence of shade, proximity to points of interest (shops, restaurants, exit, etc.), statistics on occupation of the managed parking structure, or the like. The parking assist system may then present a location of the one or more unoccupied parking spaces as well as information associated with the parking space to the driver via one or more of a video output, an audio output, or a combination of an audio and video output to a display and or speaker system associated with the parking assist system in the vehicle or to a smart device of the driver via a WiFi transmission, Bluetooth transmission, GSM transmission, or the like (step 610). Once the driver parks their vehicle in one of the one or more unoccupied parking spaces, the parking space management mechanism indicates the parking space as occupied in accordance with the process identified in FIG. 4.

If at step 604 the inquiry includes user preferences, the parking space management mechanism compares the user preferences from the vehicle as to available parking spaces to characteristic information associated with the one or more unoccupied parking spaces (step 612). Responsive to identifying a subset of the one or more unoccupied parking spaces that match the user preferences (step 614), the parking space management mechanism relays the subset of the one or more unoccupied parking spaces to the vehicle (step 616). Upon receiving the subset of the one or more unoccupied parking spaces, the parking assist system may then present a location of the one or more unoccupied parking spaces as well as information associated with the parking space to the driver (step 618).

From steps 610 and 618, the parking space management mechanism monitors the identified parking spaces until the vehicle requesting the parking space has occupied one of the one or more parking spaces thus, at step 620, the parking space management mechanism determines whether one or more of the one or more identified parking spaces becomes occupied with a vehicle other than the requesting vehicle. If at step 620 the parking space management mechanism determines that one or more of the one or more identified parking spaces becomes occupied by a vehicle other than the requesting vehicle, then the operation returns to step 604 where anew set of unoccupied parking spaces is identified. If at step 620 the parking space management mechanism determines that one or more of the one or more identified parking spaces becomes occupied by the requesting vehicle, the operation terminates.

Figure 7:
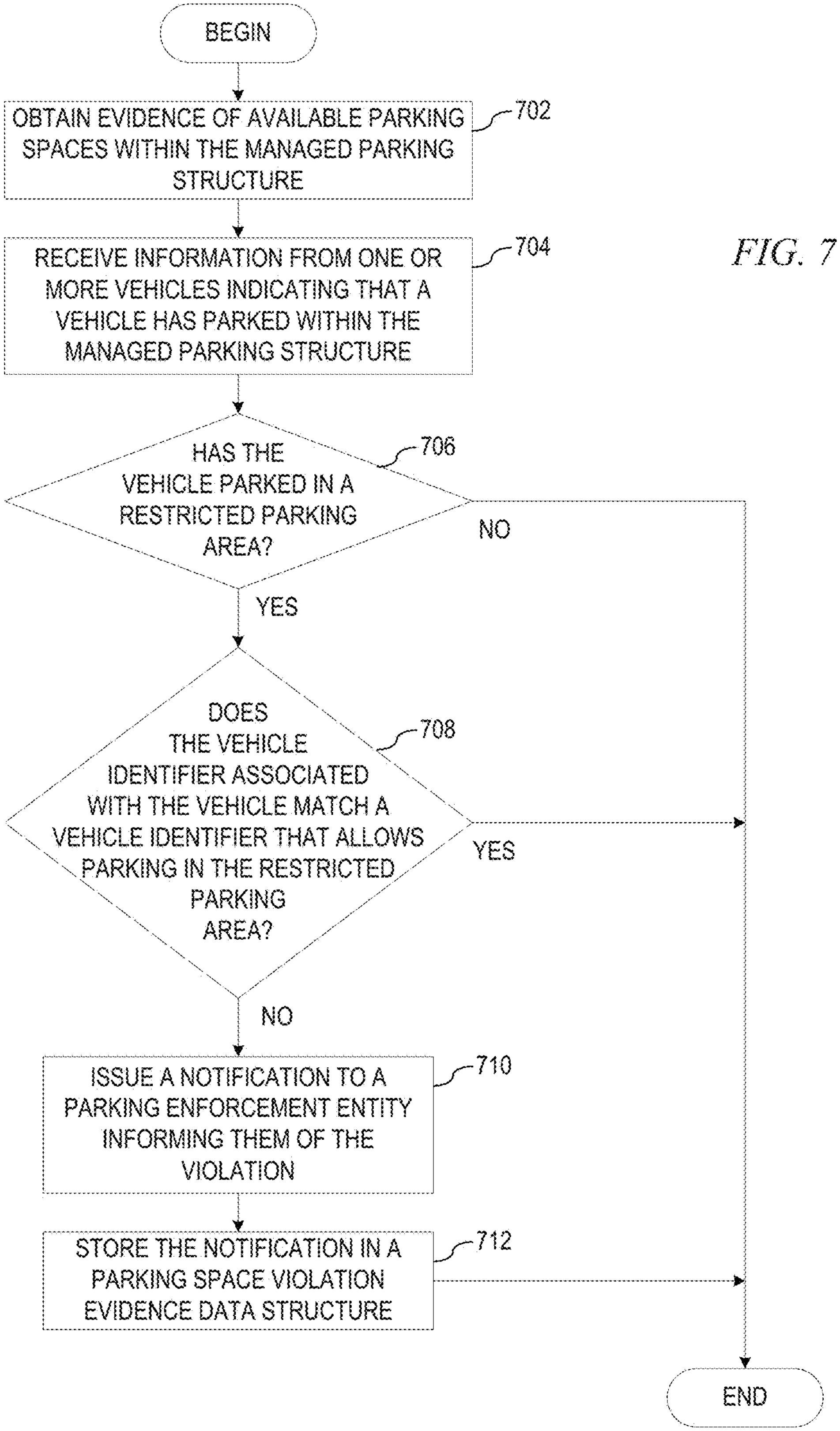
FIG. 7 depicts a flowchart of an operation performed by a parking space management mechanism in assisting in management of the managed parking structure in accordance with an illustrative embodiment.

FIG. 7 depicts a flowchart of an operation performed by a parking space management mechanism in assisting in management of the managed parking structure in accordance with an illustrative embodiment. As the operation begins, the parking space management mechanism obtains evidence of available parking spaces within the managed parking structure (step 702). The parking space management mechanism then receives information from one or more vehicles indicating that a vehicle has parked within the managed parking structure (step 704). The information from the one or more vehicles includes vehicle identifiers associated with the vehicles as well as one or more of pieces of information, such as distance information indicating one or more distances from the vehicle to other walls, columns, embankments, curbs, precast parking curbs, other vehicles, or the like, GPS coordinates, photometric cues coming from one or more cameras on the vehicle, or the like. Utilizing the received information from the one or more vehicles and the evidence of available parking, spaces, the parking space management mechanism determines whether a vehicle has parked in a restricted parking area, such as a loading zone, reserved parking space, handicap parking space, emergency vehicle only parking space, in more than one parking space, or the like (step 706). If at step 706 the parking space management mechanism determines that the vehicle has not parked in a restricted parking area, the operation terminates.

If at step 706 the parking space management mechanism determines that the vehicle has parked in a restricted parking area, the parking space management mechanism determines whether the vehicle identifier associated with the vehicle matches a vehicle identifier that allows parking in the restricted parking area (step 708). If at step 708 the parking space management mechanism determines that the vehicle identifier indicates that the vehicle may be parked in the restricted parking area, the operation terminates. However, if at step 708 the parking space management mechanism determines that the vehicle identifier indicates that the vehicle is in violation of parking in the restricted parking area, the parking space management mechanism issues a notification to a parking enforcement entity informing them of the violation (step 710) and stores the notification in a parking space violation evidence data structure (step 712), with the operation terminating thereafter.

Figure 8:
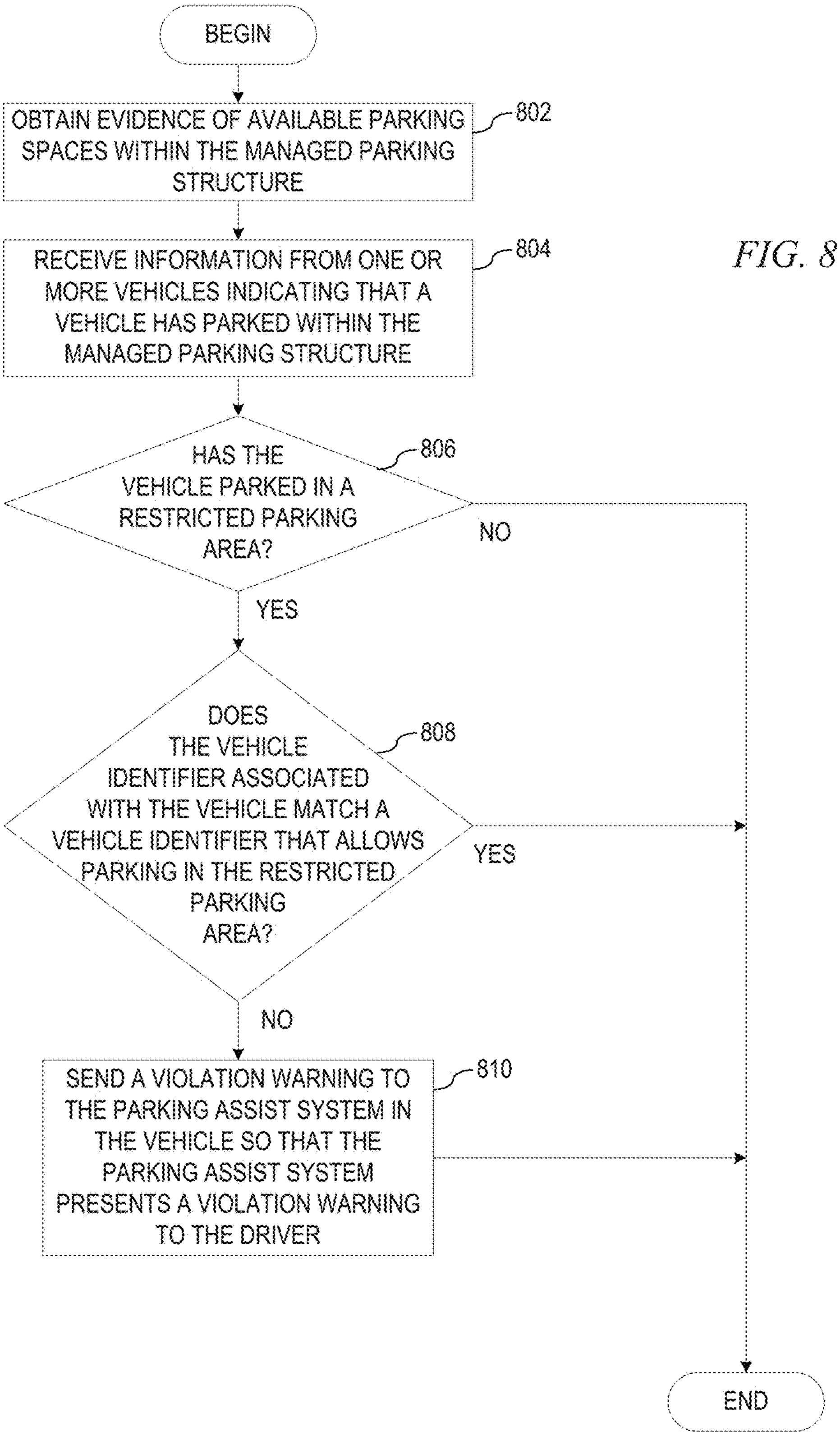
FIG. 8 depicts a flowchart of an operation performed by a parking space management mechanism in deterring parking space violations in accordance with an illustrative embodiment.

FIG. 8 depicts a flowchart of an operation performed by a parking space management mechanism in deterring parking space violations in accordance with an illustrative embodiment. As the operation begins, the parking space management mechanism obtains evidence of available parking spaces within the managed parking structure (step 802) The parking space management mechanism then receives information from one or more vehicles indicating that a vehicle has parked within the managed parking structure (step 804). The information from the one or more vehicles includes vehicle identifiers associated with the vehicles as well as one or more of pieces of information, such as distance information indicating one or more distances from the vehicle to other walls, columns, embankments, curbs, precast parking curbs, other vehicles, or the like, GPS coordinates, photometric cues coming from one or more cameras on the vehicle, or the like. Utilizing the received information from the one or more vehicles and the evidence of available parking spaces, the parking space management mechanism determines whether a vehicle has parking in a restricted parking area, such as a loading zone, reserved parking space, handicap parking space, emergency vehicle only parking space, in more than one parking space, or the like (step 806).

If at step 806 the parking space management mechanism determines that the vehicle has not parked in a restricted parking area, the operation terminates. If at step 806 the parking space management mechanism determines that the vehicle has parked in a restricted parking area, the parking space management mechanism determines whether the vehicle identifier associated with the vehicle matches a vehicle identifier that allows parking in the restricted parking area (step 808). If at step 808 the parking space management mechanism determines that the vehicle identifier indicates that the vehicle may be parked in the restricted parking area, the operation terminates. However, if at step 808 the parking space management mechanism determines that the vehicle identifier indicates that the vehicle is in violation of parking in the restricted parking area, the parking space management mechanism sends a violation warning to the parking assist system in the vehicle so that the parking assist system presents a violation warning to the driver via one or more of a video output, an audio output, or a combination of an audio and video output to a display and or speaker system associated with the parking assist system in vehicle or to a smart device of the driver via a WiFi transmission, Bluetooth transmission, GSM transmission, or the like (step 810), with the operation terminating thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for a resilient collaborative parking space management system based on multi-agent localization and local sensing. The mechanisms employ current and future vehicle infrastructure to allow for permanent cost effective characterization, advertisement, and enforcement of parking areas. The mechanisms allow monetization of parked vehicles, which represent an otherwise wasted resource. The mechanisms are robust to failure due to collaboration between and partial overlap of the sensing area of neighboring parked vehicles and can be continuously upgraded as new sensing technology and better processing power becomes available in vehicles.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. p Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for parking space management of a managed parking structure, the method comprising:

receiving, by a processor in the data processing system, first information from a vehicle that has parked in the managed parking structure;

utilizing, by the processor, the first information from the vehicle to determine a probabilistic location of the vehicle within the managed parking structure;

responsive to determining the probabilistic location of the vehicle within the managed parking structure using the first information from the vehicle, updating, by the processor, an occupied parking space evidence data structure with a vehicle identifier of the vehicle as being associated with the location of the vehicle within the managed parking structure;

receiving, by the processor, a request from the vehicle as to available parking spaces, wherein the request identifies user preferences and at least one of a location or a destination of the vehicle;

comparing, by the processor, the user preferences from the vehicle to characteristic information associated with one or more unoccupied parking spaces, wherein the characteristic information comprises a height of the parking space, a width of the parking space, a length of the parking space, whether the parking space is a disabled-only parking space, whether the parking space is an e-charging parking space, a distance from the parking space to a sidewalk, an ambient temperature associated with the parking space, and presence of shade associated with parking space;

identifying, by the processor, a subset of the one or ore unoccupied parking spaces that match the user preferences; and relaying, by the processor, the subset of the one or more unoccupied parking spaces to the vehicle, wherein upon receiving the subset of the one or more unoccupied parking spaces, a parking assist system in the vehicle presents the subset of one or more unoccupied parking spaces to a driver of the vehicle.

2. The method of claim 1, further comprising:

responsive to a failure to determine the probabilistic location of the vehicle within the managed parking structure using the first information from the vehicle, obtaining, by the processor, first information associated with other vehicles in the managed parking structure in order to identify the location of the vehicle within the managed parking structure; and responsive to determining the probabilistic location of the vehicle within the managed parking structure using the first information associated with the other vehicles, updating, by the processor, the occupied parking space evidence data structure with the vehicle identifier of the vehicle as being associated with the location of the vehicle within the managed parking structure.

3. The method of claim 1, further comprising:

receiving, by the processor, second information from the vehicle indicating that the vehicle has been moved from the location recorded for the vehicle; and responsive to determining that the vehicle has completely vacated the location recorded for the vehicle using the second information from the vehicle, removing, by the processor, the vehicle identifier of the vehicle from the evidence data structure as being associated with the location of the vehicle within the managed parking structure.

4. The method of claim 3, further comprising:

responsive to a failure to determine that the vehicle has completely vacated the location recorded for the vehicle using the second information from the vehicle, obtaining, by the processor, second information associated with the other vehicles in the managed parking structure in order to verify that the vehicle has completely vacated the location recorded for the vehicle; and responsive to determining that the vehicle has completely vacated the location recorded for the vehicle using the second information associated with the other vehicles, updating, by the processor, the occupied parking space evidence data structure with the vehicle identifier of the vehicle as being associated with the location of the vehicle within the managed parking structure.

5. The method of claim 1, wherein relaying the subset of the one or more unoccupied parking spaces includes relaying, by the processor, characteristic information associated with the subset of the one or more unoccupied parking spaces.

6. The method of claim 1, further comprising:

determining, by the processor, whether one or more of the subset of the one or more unoccupied parking spaces has become occupied by another vehicle;

responsive to one or more of the subset of the one or more unoccupied parking spaces being occupied by another vehicle, identifying, by the processor, a new subset of one or more unoccupied parking spaces that match the user preferences; and relaying, by the processor, the new subset of one or more unoccupied parking spaces to the vehicle, wherein, upon receiving the new subset of one or more unoccupied parking spaces, the parking assist system in the vehicle presents the new subset of the one or more unoccupied parking spaces to the driver of the vehicle.

7. The method of claim 1, further comprising:

determining, by the processor, whether the vehicle has parked in a restricted area;

responsive to the vehicle parking in the restricted area, determining, by the processor, whether the vehicle identifier of the vehicle indicates that the vehicle is authorized to park in the restricted area;

responsive to the vehicle identifier failing to indicate that the vehicle is authorized to park in the restricted area, issuing, by the processor, a notification to a parking enforcement entity indicating the violation; and storing, by the processor, the violation in a parking space violation evidence data structure.

8. The method of claim 1, further comprising:

determining, by the processor, whether the vehicle has parked in a restricted area;

responsive to the vehicle parking in the restricted area, determining, by the processor, whether the vehicle identifier of the vehicle indicates that the vehicle is authorized to park in the restricted area; and responsive to the vehicle identifier failing to indicate that the vehicle is authorized to park in the restricted area, issuing, by the processor, a violation warning to the vehicle, wherein, upon receiving the violation warning, a parking assist system in the vehicle presents the violation warning to a driver of the vehicle.

9. A computer program product comprising a computer readable storage medium having a computer readable program stored therein, wherein the computer readable program, when executed on a computing device, causes the computing device to:

receive first information from a vehicle that has parked in a managed parking structure;

utilize the first information from the vehicle to determine a probabilistic location of the vehicle within the managed parking structure;

responsive to determining the probabilistic location of the vehicle within the managed parking structure using the first information from the vehicle, update an occupied parking space evidence data structure with a vehicle identifier of the vehicle as being associated with the location of the vehicle within the managed parking structure;

receive a request from the vehicle as to available parking spaces, wherein the request identifies user preferences and at least one of a location or a destination of the vehicle;

compare the user preferences from the vehicle to characteristic information associated with one or more unoccupied parking spaces, wherein the characteristic information comprises a height of the parking space, a width of the parking space, a length of the parking space, whether the parking space is a disabled-only parking space, whether the parking space is an e-charging parking space, a distance from the parking space to a sidewalk, an ambient temperature associated with the parking space, and presence of shade associated with the parking space;

identify a subset of the one or more unoccupied parking spaces that match the user preferences; and relay the subset of the one or more unoccupied parking spaces to the vehicle, wherein, upon receiving the subset of the one or more unoccupied parking spaces, a parking assist system in the vehicle the subset of one or more unoccupied parking spaces to a driver of the vehicle.

10. The computer program product of claim 9, wherein the computer readable program further causes the computing device to:

responsive to a failure to determine the probabilistic location of the vehicle within the managed parking structure using the first information from the vehicle, obtain first information associated with other vehicles in the managed parking structure in order to identify the location of the vehicle within the managed parking structure; and responsive to determining the probabilistic location of the vehicle within the managed parking structure using the first information associated with the other vehicles, update the occupied parking space evidence data structure with the vehicle identifier of the vehicle as being associated with the location of the vehicle within the managed parking structure.

11. The computer program product of claim 9, wherein the computer readable program further causes the computing device to:

receive second information from the vehicle indicating that the vehicle has been moved from the location recorded for the vehicle; and responsive to determining that the vehicle has completely vacated the location recorded for the vehicle using the second information from the vehicle, remove the vehicle identifier of the vehicle from the evidence data structure as being associated with the location of the vehicle within the managed parking structure.

12. The computer program product of claim 11, wherein the computer readable program further causes the computing device to:

responsive to a failure to determine that the vehicle has completely vacated the location recorded for the vehicle using the second information from the vehicle, obtain second information associated with the other vehicles in the managed parking structure in order to verify that the vehicle has completely vacated the location recorded for the vehicle; and responsive to determining that the vehicle has completely vacated the location recorded for the vehicle using the second information associated with the other vehicles, update the occupied parking space evidence data structure with the vehicle identifier of the vehicle as being associated with the location of the vehicle within the managed parking structure.

13. An apparatus comprising:

a processor; and a memory coupled to the processor, wherein the memory comprises instructions which, when executed by the processor, cause the processor to:

receive first information from a vehicle that has parked in a managed parking structure;

utilize the first information from the vehicle to determine a probabilistic location of the vehicle within the managed parking structure;

responsive to determining the probabilistic location of the vehicle within the managed parking structure using the first information from the vehicle, update an occupied parking space evidence data structure with a vehicle identifier of the vehicle as being associated with the location of the vehicle within the managed parking structure;

receive a request from the vehicle as to available parking spaces, wherein the request identifies user preferences and at least one of a location or a destination of the vehicle;

compare the user preferences from the vehicle to characteristic information associated with one or more unoccupied parking spaces, wherein the characteristic information comprises a height of the parking, space, a width of the parking space, a length of the parking space, whether the parking space is a disabled-only parking space, whether the parking space is an e-charging parking space, a distance from the parking space to a sidewalk, an ambient temperature associated with the parking space, and presence of shade associated with the parking space;

identify a subset of the one or more unoccupied parking spaces that match the user preferences; and relay the subset of the one or more unoccupied parking spaces to the vehicle, wherein, upon receiving the subset of the one or more unoccupied parking spaces, a parking assist system in the vehicle presents the subset of one or more unoccupied parking spaces to a driver of the vehicle.

14. The apparatus of claim 13, wherein the instructions further cause the processor to:

responsive to a failure to determine the probabilistic location of the vehicle within the managed parking structure using the first information from the vehicle, obtain first information associated with other vehicles in the managed parking structure in order to identify the location of the vehicle within the managed parking structure; and responsive to determining the probabilistic location of the vehicle within the managed parking structure using the first information associated with the other vehicles, update the occupied parking space evidence data structure with the vehicle identifier of the vehicle as being associated with the location of the vehicle within the managed parking structure.

15. The apparatus of claim 13, wherein the instructions further cause the processor to:

receive second information from the vehicle indicating that the vehicle has been moved from the location recorded for the vehicle; and responsive to determining that the vehicle has completely vacated the location recorded for the vehicle using the second information from the vehicle, remove the vehicle identifier of the vehicle from the evidence data structure as being associated with the location of the vehicle within the managed parking structure.

16. The apparatus of claim 15, wherein the instructions further cause the processor to:

responsive to a failure to determine that the vehicle has completely vacated the location recorded for the vehicle using the second information from the vehicle, obtain second information associated with the other vehicles in the managed parking structure in order to verify that the vehicle has completely vacated the location recorded for the vehicle; and responsive to determining that the vehicle has completely vacated the location recorded for the vehicle using the second information associated with the other vehicles, update the occupied parking space evidence data structure with the vehicle identifier of the vehicle as being associated with the location of the vehicle within the managed parking structure.

17. The computer program product of claim 9, wherein the computer readable program to relay the subset of the one or more unoccupied parking spaces includes further causes the computing device to relay characteristic information associated with the subset of the one or more unoccupied parking spaces.

18. The computer program product of claim 9, wherein the computer readable program further causes the computing device to:

determine whether one or more of the subset of the one or more unoccupied parking spaces has become occupied by another vehicle;

responsive to one or more of the subset of the one or more unoccupied parking spaces being occupied by another vehicle, identify a new subset of one or more unoccupied parking spaces that match the user preferences; and relay the new subset of one or more unoccupied parking spaces to the vehicle, wherein, upon receiving the new subset of one or more unoccupied parking spaces, the parking assist system in the vehicle presents the new subset of the one or more unoccupied parking spaces to the driver of the vehicle.

19. The apparatus of claim 13, wherein the instructions to relay the subset of the one or more unoccupied parking spaces includes further cause the processor to relay characteristic information associated with the subset of the one or more unoccupied parking spaces.

20. The apparatus of claim 13, wherein the instructions further cause the processor to:

determine whether one or more of the subset of the one or more unoccupied parking spaces has become occupied by another vehicle;

responsive to one or more of the subset of the one or more unoccupied parking spaces being occupied by another vehicle, identify a new subset of one or more unoccupied parking spaces that match the user preferences; and relay the new subset of one or more unoccupied parking spaces to the vehicle, wherein, upon receiving the new subset of one or more unoccupied parking spaces, the parking assist system in the vehicle presents the new subset of the one or more unoccupied parking spaces to the driver of the vehicle.

* * * * *